UNITED STATES PATENT OFFICE.

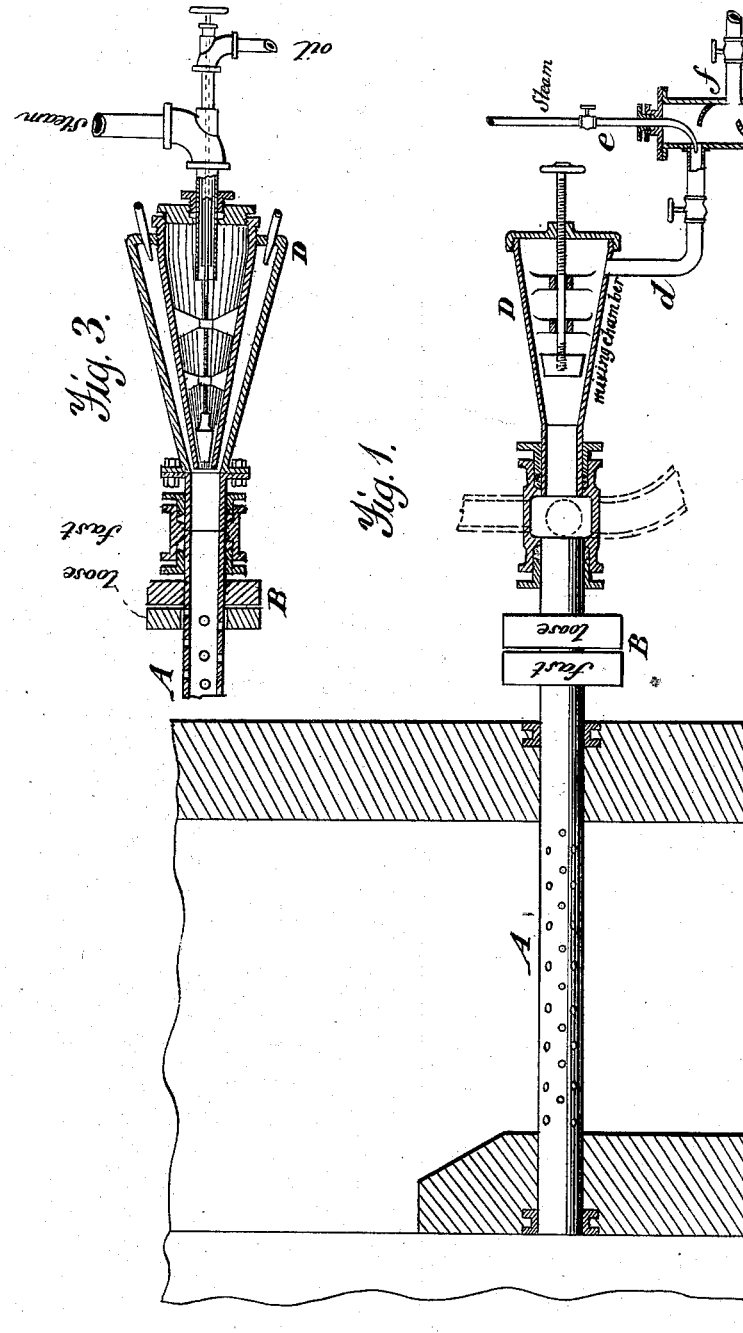

HARVEY T. LITCHFIELD, OF HULL, AND DAVID RENSHAW, OF COHASSET, MASSACHUSETTS.

HYDROCARBON-FURNACE.

SPECIFICATION forming part of Letters Patent No. 262,957, dated August 22, 1882.

Application filed January 18, 1882. (No model.)

*To all whom it may concern:*

Be it known that we, HARVEY T. LITCHFIELD, of Hull, in the county of Plymouth, and DAVID RENSHAW, of Cohasset, in the county of Norfolk, and State of Massachusetts, have invented certain new and useful Improvements in Hydrocarbon-Furnaces; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to the burning of a combined mixture of hydrocarbon oils, air, or air and steam and other gaseous vapor or carbureted air, but more particularly to the vapors generated from petroleum, and it has particular relation to a general system adopted by us for that purpose, the object and instrumentalities of which have been described in applications for patents filed herewith, or nearly so.

The object of the invention is to combine with a mixing-chamber, for all the elements of combustion, a trap, and after mixing said elements in said chamber again to mix them in an additional chamber, said additional chamber also forming a controlling-nozzle for the supply of said mixture to a furnace to be used as fuel. It must be understood, however, that the aforesaid mixing-chamber is really the gas-generating chamber, the size and form of which will be governed by the quantity required for use.

The great difficulty heretofore experienced in burning mineral oils has been to produce a chemical union of these gases, and in controlling the requisite measure of each of the combustible constituents and abstracting from the oil the residuum or heavy paraffine matter; and, further, to prevent the choking or clogging of the burners by the deposition thereon of the carbon particles, which has heretofore been detrimental, as far as we know, to hydrocarbon-furnaces now in use, and which has caused the abandonment of very many otherwise useful devices.

We do not claim by any means to be the first to introduce hydrocarbon vapor or carbureted air, for we know that many attempts have been made in this line of invention; but we do claim to be the first by our system to introduce carbureted air made up of volatile vapors of oil and air, or oil, air, and steam, the air either being heated or in its normal condition, in such manner that its density and perfect chemical union are such that it retains its quality up to the time of its being ignited. Therefore having our general system in view and to further perfect the same and to overcome the evils pointed out is the further object of our invention; and to this end it consists in preparing inflammable gas or gases mixed with atmospheric air or air and steam, the air being heated or not, either at the place where the gas or gases are generated or at any other convenient place, and the admixture thereof may be effected at any point, but preferably in our "trap-chamber," by blowing or pumping or otherwise forcing or admitting the atmospheric air among the gases, either in a closed flue, chamber, or gas-holder or other vessel, or, in other words, by forcing or pumping the gas or gases into or among the atmospheric air, and forcing the air and gases thus made through separate pipes into buildings or other places where heat is required. The air and gas pipe may be joined at any desired point previous to the gas issuing from the burners, as may be readily seen by reference to Fig. 3, or to the union stuffing-box at Fig. 1, the connections being shown in dotted lines, they of course being controlled by suitable cocks.

Before alluding particularly to the drawings we would point out another important feature in which our invention consists, and that is our rotating grooved or ribbed perforated burner. The rapid rotation of the burner and its inwardly-projecting ribs cuts up and agitates the gaseous vapor, so that it is still more intimately mixed, and hence there is but little danger of the carbon disengaging itself from the other elements and settling on the burner.

In the drawings, Figure 1 shows a cross-section of a furnace, the rotating burner being in position. Fig. 2 is a detailed view, in perspective, of our grooved rotating perforated burner. Fig. 3 is the form of nozzle we prefer, and which may be used without a trap or mixing chamber, it being constructed to trap the heavy oil by its outward and downward inclination.

A is the burner; B, the fast and loose pulleys; C, the union stuffing-box, and D the trap and mixing chamber independent of the trap proper. E is the principal mixing-chamber, oil-reservoir, and trap, provided with its various connections $a\ b\ c$ at its bottom and $d\ e\ f$ at its top. The peculiarity of this chamber and trap is that the gaseous mixture passes through a double process before its exit into the supply chamber or nozzle. The steam and oil are first mixed at the bottom, where the steam becomes saturated with vapor. The mixture then passes up the chamber, where it meets with a regulated quantity of air or steam and air. This combined mixture is again broken up by means of baffle-plates, and in this condition is forced into another mixing-chamber, from which it is fed to the burner. The various elements constituting this gas, it will be seen, are regulated and under complete control.

Having reference to Fig. 3, as before stated, the heavy oil, should there be any, naturally flows to the lowest portion of the nozzle—namely, the outside—from whence it can be drawn. In like manner, the heavy oils precipitated to the bottom of the trap (shown by letter $c$, Fig. 1) may also be drawn off after all the light volatile gases have been extracted from it.

Thus it will be seen that we produce at once a cheap, simple, and durable hydrocarbon-furnace and gas-producer.

The operation will be readily understood from the foregoing and by reference to the figures on the drawings.

What we claim as our invention, and desire to secure by Letters Patent, is—

1. The combination, in a hydrocarbon-furnace, of the grooved rotating pipe A, perforated, as described, the mixing-chamber D, and its regulating-valve, for the purpose and in the manner set forth.

2. The combination, in a hydrocarbon-furnace, of the rotating pipe and the mixing-chamber E, said chamber being provided with a double set of induction and mixing pipes, whereby a complete mixture of the gases is produced before being introduced into the furnace, in the manner shown and described.

3. The combination, with a hydrocarbon-furnace, of the rotating pipe, grooved as described, the double stuffing-box, and the supply-nozzle, said nozzle having air, steam, and oil supply conduits and a regulating-valve, said nozzle also being adapted to perform the double function of trap and nozzle, in the manner shown and described.

In testimony that we claim the foregoing as our own act we affix our signatures in presence of two witnesses.

HARVEY T. LITCHFIELD.
DAVID RENSHAW.

Witnesses:
WILLIAM BRECK,
S. D. WILLIAMS.